United States Patent [19]
Smithlin

[11] 3,820,031
[45] June 25, 1974

[54] METHOD AND APPARATUS FOR DECODING A MANCHESTER WAVEFORM

[75] Inventor: John R. Smithlin, North Hollywood, Calif.

[73] Assignee: The United States of America as represented by the Secretary of the Navy, Washington, D.C.

[22] Filed: July 25, 1973

[21] Appl. No.: 382,412

[52] U.S. Cl. .................. 328/119, 307/268, 328/150, 340/146.3 Z, 340/347 DD

[51] Int. Cl. .............................................. H03k 13/00

[58] Field of Search ........ 178/5.1; 179/1.5 R, 1.5 C; 307/268; 325/325; 328/114, 115, 118, 119, 150, 189, 34, 36; 340/146.3 Z, 347 P, 347 DD

[56] References Cited

UNITED STATES PATENTS

| | | | |
|---|---|---|---|
| 3,078,344 | 2/1963 | Crafts et al. | 307/208 X |
| 3,272,995 | 9/1966 | Alexander et al. | 307/293 X |
| 3,560,763 | 2/1971 | Downey et al. | 307/235 R |
| 3,728,716 | 4/1973 | Jacoby et al. | 340/347 DD |
| 3,755,654 | 8/1973 | Dellacato | 340/347 DD X |

OTHER PUBLICATIONS

Fang et al., "Clock and Data Retrieval Circuit," IBM Tech. Discl. Bull., Vol. 5, No. 11, p. 92–93; April 1963.

*Primary Examiner*—Stanley D. Miller, Jr.
*Assistant Examiner*—L. N. Anagnos
*Attorney, Agent, or Firm*—R. S. Sciascia; P. N. Critchlow

[57] ABSTRACT

A circuit is disclosed and is used for the purpose of decoding trapezoidal serial waveforms of the Manchester waveform type which is generally a 6–36 bit trapezoid serial wave, or the like. The present circuit utilizes the zero crossovers of the waveforms to provide the decoding capability by initiating a shift register clock pulse, and its circuitry is such that the zero crossovers at the beginning or end of each bit length are ignored.

6 Claims, 3 Drawing Figures

METHOD AND APPARATUS FOR DECODING A MANCHESTER WAVEFORM

A Manchester waveform is a 6-36 bit trapezoid serial wave used to transmit digital information, the first wave of the series and all subsequent in-phase waves being of a binary logic level "one." All waves 180° phase-shifted from the first wave are of a logic level "zero." The length of time that a "one" stays a "one" or a "zero" stays a "zero" is known as a bit length. The serial wave is characterized by the fact that, although each bit length may not return to a zero voltage level, at the center of each and every bit length, the Manchester waveform repetitively crosses through zero. The invention utilizes the repetitive zero center crossovers to initiate a shift register clock pulse, and its circuitry is such that the zero crossovers at the beginning or end of each bit length are ignored. A pair of single shot multivibrators are employed, one of which responds to the waveform, while the other responds to an inverted version of the derived waveform. Inversion assures response to every bit length whether of a " one" or "zero" level. RC control of the single shot response assures a response pulse slightly longer than one half of the bit length so as to preclude multi-vibrator outputs responsive to zero crossovers irregularly occurring at the beginning or end of each bit length. Multi-vibrator outputs are received by a digital "or" circuit the output of which is inverted and used as a shift clock for shifting data bits from the derived serial wave into a shift register.

BACKGROUND OF THE INVENTION

The present invention relates to digital data decoders and, in particular, to the decoding of information contained in the so-called Manchester waveform or the like.

Manchester waveforms are used to transmit digital information having binary logic levels of "zero" and "one," the waveform generally being a 6-36 bit trapezoid serial wave in which any single wave that is 180° phase shifted from the first wave is logic "zero." Other single waves in phase with the first one are logic "one." An example of such a waveform is shown in FIG. 2, waveform A. As shown, the wave is a series of the trapezoid waves, such as are shown in FIG. 1, put together to form the "zero"-"one" data bit combinations.

One of the difficulties in using Manchester waveforms to transmit binary logic is that the transition points between the "zero" and "one" voltage crossover points do not regularly cross through zero at the end of a bit length. Obviously, if each single data bit began and ended at zero, it would be a relatively simple matter to decode the information. Since this simplified technique is not readily available, decoding techniques have been forced to resort to the use of relatively complicated and expensive devices which also may not be as reliable as could be desired.

STATEMENTS OF THE OBJECTS OF THE INVENTION

It is therefore a basic object of the present invention to provide a simple, reliable means for decoding a Manchester waveform and more specifically, to provide a circuit capable of utilizing the zero crossovers to provide the decoding capability.

Other objects will become more apparent in the detailed description which is to follow.

SUMMARY OF THE INVENTION

Broadly considered, the objects of the invention are achieved by utilizing only the zero crossover transitions occurring in the center of each data bit length of a Manchester waveform to initiate a clock pulse used to decode the wave.

BRIEF DESCRIPTION OF THE DRAWINGS

A preferred embodiment of the present invention is illustrated in the accompanying drawings of which.

DESCRIPTION OF THE PREFERRED EMBODIMENT

Figure 1:
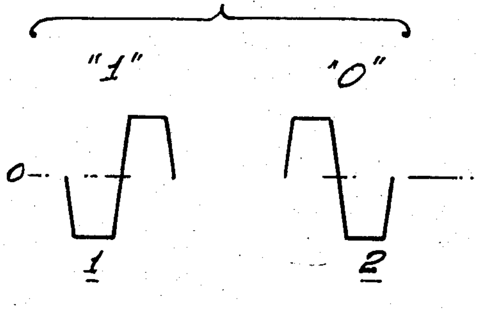
FIG. 1 shows a pair of trapezoid waves of the type used to form the "one" and "zero" data bit combinations present in a Manchester waveform.
Figure 2:
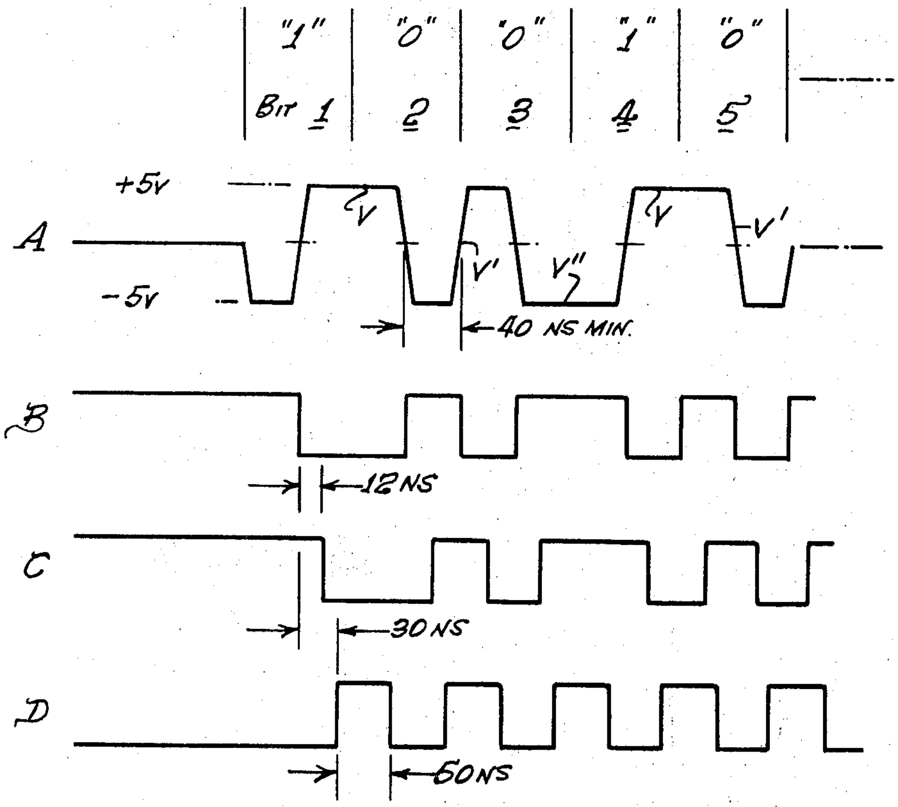
FIG. 2 is a series of waveforms representing different stages in the processing of the derived Manchester waveform.

The present invention best can be understood by first considering in greater detail the nature of the so-called Manchester waveform and, especially, the problems involved in providing a simple and effective manner of decoding binary logic levels contained in these waveforms. However, it initially should be understood that, although the Manchester waveform exemplifies the present problem, the scope of the invention is intended to extend to the decoding of comparable waves whether or not such waves are explicitly known to the art as Manchester waveforms. FIGS. 1 and 2 are provided to illustrate the waveform and to demonstrate the difficulties presented in decoding its information. FIG. 1 simply provides examples of single trapezoid waves of the type used to form the Manchester serial waveform. FIG. 2, Waveform A, is the Manchester wave formed by combining waves 1, 2, etc., of FIG. 1, although, in this regard, it will be understood that Waveform A shows only a portion of the serial wave which, as has been stated, may be a 6-36 bit serial wave formed of a equivalent number of trapezoid waves similar to waves 1 and 2. To transmit digital information, the arrangement conventionally is such that the wave bit of the serial wave and all other single waves in phase with the first wave are a logic level "one," while any single wave that is 180° phase shifted from the first wave is a logic "zero." This phase shift is most apparent in waves 1 and 2 of FIG. 1. It also is important to note that immediately to the right of each of the zero crossover points at the center of each bit length, the Manchester wave is at a $V^+$ for a logic "one" and at a $V^-$ for a logic "zero," this condition continuing at least to the end of each bit length.

It will be noted that waves 1 and 2 of FIG. 1 are representative of a "one" or a "zero" respectively and that each is of a particular bit length that begins and terminates at the zero voltage level. However, when combined to form Wave Form A of FIG. 2, the combination is such that wave 1 has a bit length which terminates at voltage level V, while wave 2 has a bit length terminating at voltage level $V^1$ which is a zero crossover point. Since waves 1 and 2 represent opposite binary logic levels, any decoding operation dependent upon the use of each and every zero crossover point in the Wave Form A would be unacceptable since these crossovers do not regularly represent transitions of a "one" to a "zero" or vice versa. However, the Manchester waveform does have one regularly recurring characteristic which is the fact that, as appears in Wave Form A, at the center of each and every one of its bit lengths the waveform crosses through zero. This particular characteristic provides a basis upon which the circuitry shown in FIG. 3 operates to achieve the decoding function of the present invention.

Figure 3:
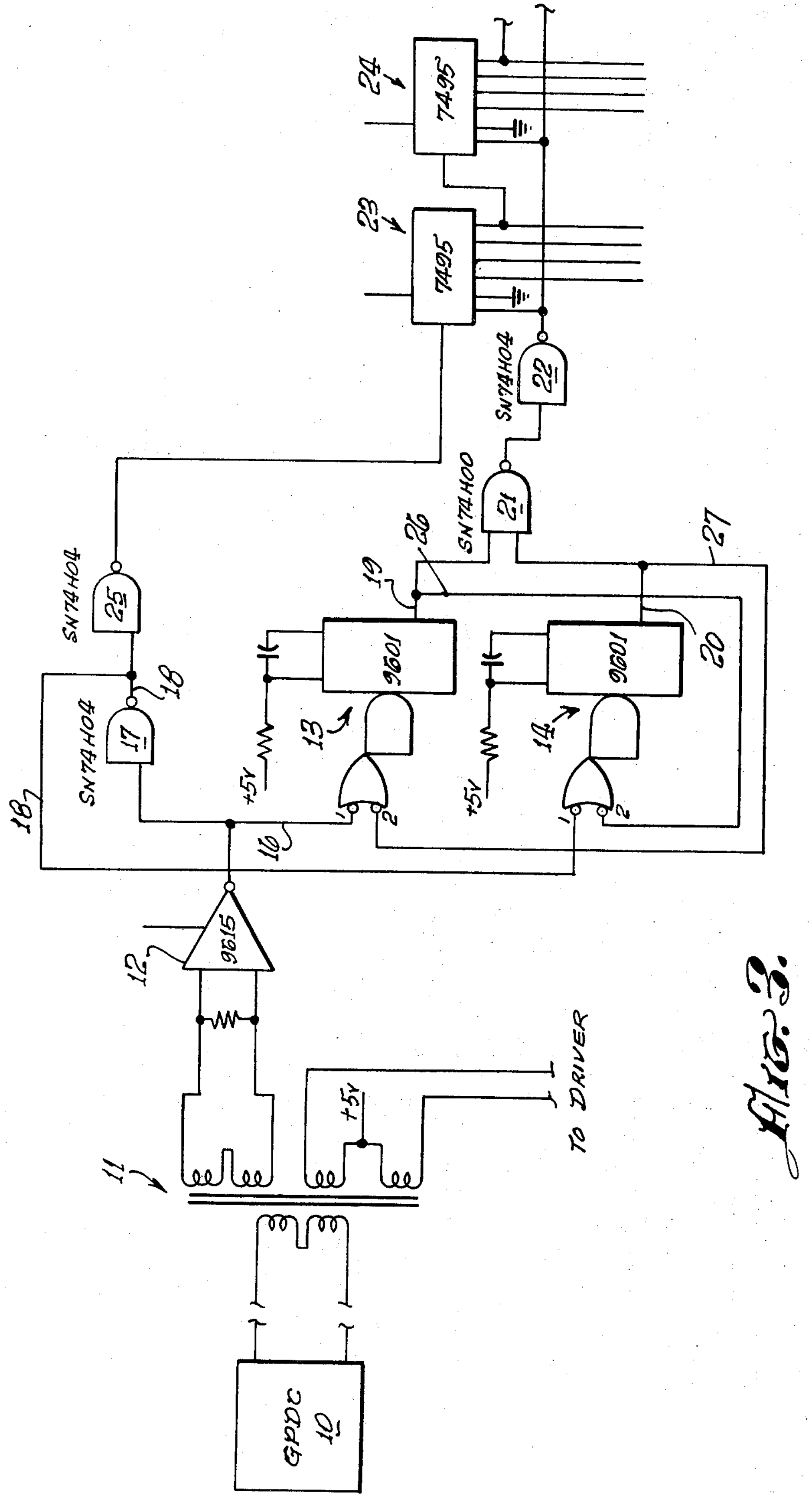
FIG. 3 is a circuit diagram schematically illustrating the component arrangement used to process this waveform.

Referring to FIG. 3, a typical Manchester signal waveform, such as Wave Form A of FIG. 2 is derived from a general purpose digital computer or the like and applied through a conventional transformer 11 to a line receiver, such as receiver 12, which may be a Fairchild 9615 employed to square the edges of the wave and to provide, for example, voltage levels of 0 or 4 plus or minus 1 volt. The squared form of the Manchester wave is shown as Wave Form B of FIG. 2.

Waveform B then is passed to a pair of conventional, monostable or single-shot multivibrators 13 and 14, such as the commercially available Fairchild 9601 multivibrators. Each multivibrator has a pair of input pins 1 and 2 and, as seen, Wave Form B is applied directly to pin 1 of multivibrator 13 through line 16, while multivibrator 14 receives at its input 1 an inverted version of the Wave Form B. Inversion of waveform B is accomplished by using a conventional SN 74H04 inverter 17 and conducting its output to input 1 through line 18. As a matter of terminology the waveform applied directly to multivibrator 13 can be called waveform B, while the inverted waveform applied to multivibrator 14 is a "NOT B." As already explained, the Manchester waveform is characterized by the fact that its bit lengths representative of logic "zero" have a V— to the right of their center zero crossovers. Also, bits representative of logic "one" have a V+ to the right of these points. Consequently, either the B form or the "NOT B" form of the serial wave will have a high to low voltage transition at the center of each successive bit of the series. Such being the case, this high to low transition of each successive bit is used to trigger one or the other of the multivibrators 13 and 14 so that the combined outputs of the multivibrators will represent every succeeding bit in the serial wave whether it is the high to low transitions occurring at the center of each bit length pulse one or the other of the multivibrators to trigger it to its quasi-stable state during which it produces an output pulse in its output liner 19 or 20. Conventionally, the active or quasi-stable state exists as an output pulse for a predetermined period of time usually dependant on imposed resistance-capacitance (RC) value. At the end of this time, the circuit automatically resumes its stable state.

The outputs of the multivibrators 13 and 14 are gated through a conventional "or" gate 21, such as a 74HOO or its equivalent, to produce Wave Form D of FIG. 2. Wave Form D then is inverted in another SN74HO4 unit, identified by block 22, and used as a shift clock for a serial string of shift registers 23, 24, and so forth, there being sufficient number of registers to accommodate the total of the bits in the Manchester waveform. The gating of the registers occurs each time Wave Form D goes from low to high and the high or low existing at that time on Wave Form C is shifted into the registers as a bit of data. As will be noted in FIG. 2, Wave Form C is substantially the same as the derived and squared Wave Form B, the only difference being a slight time delay. To achieve Wave Form C, the inverted form of Wave Form B contained in line 18 is re-inverted in another inverter, such as inverter 25.

Although the circuitry thus far described utilizes the zero center crossover points of each bit length to shift logic data into the shift registers, it also is highly important to insure that zero crossovers at the end and the beginning of each bit length are ignored or, in other words, are functionally inoperative insofar as gating the registers is concerned. The ignoring of these undesired crossover points is assured by controlling the length of each output pulse of the multivibrators. Specifically, each such pulse, which, of course, is representative of one shot of each multivibrator is made slightly longer than one half of a bit length. This feature extends the output beyond the end of each bit length to prevent the multivibrators from again being triggered at these end points. As now should be clear, the decoding is made dependent only upon the center crossover points and not the end points. Pulse length control is dependent upon its RC value and, in the present instance the resistor-capacitor combination on each single shot is selected from the specification sheet of the multivibrator to provide the desired result which is the provision of the output pulse slightly longer than a half of of a bit length. Another feature of the present multivibrators is that each of the multivibrators is prevented from triggering until the previously triggered multivibrator has completed its pulse. To accomplish this purpose, feedback connections 26 and 27 couple the outputs of each multivibrator to the unused pins 2 of the other multivibrators.

The operation of the present decoder should be reasonably clear from the foregoing description. In general, the circuit provides a simple yet thoroughly reliable manner of decoding Manchester waveforms by using the zero crossover in the center of each bit length to initiate a shift register clock pulse. The arrangement further enables the zero crossovers at the end or beginning of each bit length to be ignored. Manifestly, the specific circuitry which has been described represents only one implementation and, of course variations within the state of the art are contemplated.

Obviously many modifications and variations of the present invention are possible in the light of the above teachings. It is therefore to be understood that within the scope of the appended claims the invention may be practiced otherwise than as specifically described.

I claim:

1. Apparatus for decoding incoming binary logic derived in the form of a multi-bit series of waves each of said multi-bits having a bit length regularly crossing zero voltage at the center of its length and irregularly crossing said zero voltage at their beginning and end points, the logic of said series being such that the first wave and all subsequent in-phase waves represent one binary logic level while all phase-shifted waves represent another level, said apparatus comprising:

means having an input coupled to said incoming serial wave for inverting said series and providing an inverted output, a pair of monostable switches each having a stable state and a triggered quasi-stable state, one of said switches having an input receiving the incoming form of said serial wave and the other an input coupled to and receiving said inverted output, said quasi-stable state of said switches being triggered by the voltage transitions occuring at said zero-crossing center of each of said bit lengths whereby in-phase waves trigger one of the switches and phase-shifted and inverted waves trigger the other to produce output pulses for each bit of the incoming serial wave, means for controlling the length of said output pulses to provide a pulse length slightly longer than a half a bit length whereby output pulses occur only in response to said center crossing voltage transitions, clock means combining said output pulses of said switches for producing a clock pulse for each wave bit, and decoder means responsive to said clock pulses for receiving the binary logic of said incoming serial wave whereby said decoder receives said logic only in response to voltage transitions occurring at the zero-crossing center of each bit length.

2. The apparatus of claim 1 wherein said incoming serial wave is in the form of a combined series of trapezoid waves, said apparatus further including:

means for squaring the edges of said incoming waveform, said means having a pair of outputs one of which is coupled directly to said input of one of said switches and the other to the input of the other of said switches through said inverter means, and a second inverter means for receiving the output of said first-mentioned inverter means, said second means having an output coupled to said decoder means.

3. The apparatus of claim 1 wherein said switches are in the form of a pair of monostable multi-vibrators, and said means for controlling the pulse length of said multivibrator outputs is in the form of a resistor-capacitor combination having a fixed time constant.

4. The apparatus of claim 3 wherein said decoder means is a shift register, said clock means including an "OR" circuit for combining said multi-vibrator outputs and producing said clock pulses.

5. The apparatus of claim 3 further including:

feedback means coupling the output of each multi-vibrator to the other multi-vibrator for restricting the triggering of either multi-vibrator until the other multi-vibrator completes its output pulse.

6. A method of decoding an incoming Manchester waveform derived in the form of a combined series of wave bits representing either a "zero" or a "one" binary logic level, the "zero" wave bits being 180° out-of-phase with the "one" bits and each wave bit having a bit length regularly crossing zero voltage at its center, the method comprising the steps of:

initiating a clock pulse of a predetermined length each time said center crosses said zero voltage, and using said initiated pulses to shift said binary logic levels of said incoming waveform into a decoder read-out;

said clock pulses having a length slightly greater than one-half a bit length whereby the logic level of each wave bit of said incoming wave is shifted into the read-out and whereby said clock pulses are initiated only in response to said center crossings.

* * * * *